(12) United States Patent
Edlinger

(10) Patent No.: US 6,493,159 B1
(45) Date of Patent: *Dec. 10, 2002

(54) OPTICAL ELEMENT AND ITS MANUFACTURING PROCESS

(75) Inventor: Johannes Edlinger, Franstanz (AT)

(73) Assignee: Unaxis Balzers Aktiengesellschaft (LI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/756,140

(22) Filed: Nov. 26, 1996

(30) Foreign Application Priority Data

Nov. 1, 1996 (CH) .............................................. 2694/96

(51) Int. Cl.[7] .............................................. G02B 27/14
(52) U.S. Cl. ...................... 359/832; 359/831; 359/629; 359/634; 156/100; 156/101; 156/102; 156/153; 156/154
(58) Field of Search ............................... 359/366, 496, 359/352, 834, 634, 495, 638, 831, 833, 483, 485, 629; 156/99, 100, 101, 102, 153, 154, 250, 310

(56) References Cited

U.S. PATENT DOCUMENTS

| 2,234,665 A | * | 3/1941 | Bauer ........................... 359/834 |
| 2,737,076 A | | 6/1956 | Rock, Jr. ....................... 156/99 |
| 3,753,822 A | * | 8/1973 | Heinrich ....................... 156/250 |
| 3,879,182 A | * | 4/1975 | Strack ........................... 359/831 |
| 4,709,988 A | * | 12/1987 | Kai et al. ...................... 359/613 |
| 4,733,926 A | * | 3/1988 | Title ............................. 359/352 |
| 5,066,101 A | * | 11/1991 | Aoki et al. ................... 359/833 |
| 5,096,520 A | * | 3/1992 | Faris ............................ 156/99 |
| 5,221,982 A | * | 6/1993 | Faris ............................ 349/8 |
| 5,236,541 A | * | 8/1993 | Sugahara ..................... 156/556 |
| 5,237,442 A | | 8/1993 | Khoe et al. .................. 359/189 |
| 5,245,472 A | * | 9/1993 | Hegg ........................... 359/496 |
| 5,260,830 A | | 11/1993 | Nishida et al. |
| 5,453,859 A | | 9/1995 | Sannohe et al. .............. 349/9 |
| 5,566,367 A | * | 10/1996 | Mitsutake et al. ........... 359/485 |
| 5,748,365 A | * | 5/1998 | Chen ............................ 359/366 |
| 5,837,082 A | * | 11/1998 | Gräfe ........................... 156/154 |

FOREIGN PATENT DOCUMENTS

| DE | 4033842 | 4/1991 |
| EP | 0359461 | 3/1990 |
| EP | 0359658 | 3/1990 |
| GB | 754590 | 8/1956 |
| JP | 01156701 | 6/1989 |

* cited by examiner

Primary Examiner—John Juba, Jr.
(74) Attorney, Agent, or Firm—Notaro & Michalos PC

(57) ABSTRACT

An optical device has a base body with a surface, a first optically effective, multilayer system in the base body, terminating at an intersection, and a second optically effective, multilayer system. The second system has a layer along the base body surface, spanning the intersection. The surface of the base body, including the intersection, are jointly treated by at least one of: milling, grinding, polishing, and lapping. A further base body with a further surface and a third optically effective system terminating at a further intersection area at the further surface also has a further layer between the second optically effective multilayer system and the further surface.

16 Claims, 6 Drawing Sheets

OPTICAL ELEMENT AND ITS MANUFACTURING PROCESS

FIELD AND BACKGROUND OF THE INVENTION

The present invention concerns an optical element that comprises a base body and an optically effective layer system of which at least one layer system surface contacts the base body according to features of the invention.

The invention also comprises a related manufacturing process the utilization of such a component or process as well as an optical projection arrangement with such a component.

INTRODUCTION

In DE-40 33 842 a cuboid optical element composed of dichroitic layers is referred to as a "dichroitic prism."

In this application the term X-cube is used.

The present invention starts with the problems that exist with known X-cubes, for example, as described in DE-40 33 842, or that occur in its manufacture. The present invention which was developed in order to find a solution to the problems with such elements, can be applied to a number of other optical elements.

For this reason this description begins with the specific problems to be solved on X-cubes and based thereon explains the application of the invention in more general terms.

DESCRIPTION

Based on FIG. 1 the functional principle of an X-cube is explained. Optical elements of this type are principally used in projectors in order to recombine the red/green and blue channels in the spectral range of the visible light. As shown in FIG. 1 such an X-cube 1 comprises-four individual prisms 2a to 2d which can, for example, be made of BK7 glass. In their cross-section they form right-angled isoceles triangles with an angle of 90°, usually with a tolerance of over ±60 angular seconds and hypotenuse angles of 45° with tolerances of a few angular minutes. The length of the hypotenuse is typically between 5 mm and 50 mm, preferably 40 mm. Embedded between the two prism pairs 2a and 2b on the one side, 2d and 2c on the other side, there is an optically effective system 5 that largely reflects visible light in the blue range but largely transmits visible light in the green or red range. FIG. 1 shows a part of the blue reflector layer system as a color splitting system, labeled 5', the other 5".

Embedded between the two prism pairs 2a and 2d on the one side, 2b and 2c on the other side there is an additional, optically effective layer system 7, that largely reflects light in the red range but largely transmits light in the green range and the blue range. In FIG. 1 also the two legs of the red reflector layer system are shown as a color splitter system, labeled 7' and 7".

On the X-cube there are three input channels for red, green and blue light from corresponding sources, for example, LCD controlled, and an output channel with the recombined input signals. On the reflector systems, between each of said prism pairs, the correspondingly colored light, and particularly S-polarized light with an incidence of less than 45° is reflected. In addition the hypotenuse surfaces of the prisms 2 can be and usually are coated with an antireflection layer system.

Because the pixels of the red-blue-green input channels should converge as accurately as possible, the angle tolerances on the prism 2 and in the assembled X-cube must be very narrow.

Large tolerances result in a poor imaging quality, because the pictures do not accurately converge: blurring or color fringes occur.

Location 9, shown with dashes in FIG. 1 where the four individual prisms 2 meet, is also located within the imaging optical path. Optical interferences created in this location manifest themselves, as mentioned for example, as a blurred picture in the output channel OUT. It is a requirement of such elements and their manufacturing process to minimize the interferences, particularly in this location 9.

From DE-40 33 842, for example, it is known that X-cubes can be manufactured from four prisms 2 according to FIG. 1. The four individual prisms are first manufactured in their exact dimensions through milling, grinding and polishing. Subsequently they are coated with the appropriate layer system along their legs, and possible on their hypotenuse surfaces with an antireflection coating. Finally the coated individual prisms 2 are cemented together.

Disadvantages of the Known Processes and Known X-cubes

The handling effort required for manufacturing the X-cubes as described, for example, in DE-40 33 842, is very high: First, each of the three lateral sides of each individual prism 2 must be mounted or fixed by plastering, blocking or wringing as shown in FIG. 1 before the glass can be worked. Subsequently the surfaces must be cleaned for coating the individual prisms 2, and then mounted and dismounted for the coating process. On an average two sides per individual prism need to be coated. This laborious handling considerably raises the production costs for such X-cubes.

From FIG. 1, particularly location 9, it is evident that the coating of the red and blue reflecting layer systems must be executed in such a way that the coating does not wrap around the 90° edges of the individual prisms. This requires sophisticated coating fixtures or masking of the legs on which no coating may be deposited. In this respect we refer to U.S. Pat. No. 2,737,076 (Rock et al.).

During the coating and the entire handling of the individual prisms 2, the 90° prism edges are exposed without protection, that is, especially those edges which according to the foregoing explanation must be very accurate. This inevitably leads to chipping unless laborious precautions to protect these edges are taken, which again increases the costs.

If, for example, anything goes wrong during the coating of the individual prisms 2, such an individual piece must be remounted, ground, and repolished, otherwise it would have to be discarded. Correction processes are at best very difficult to implement.

Cementing in the exact relative position of the individual prisms 2 is very difficult and laborious. Complicated processes such as described in DE-40 33 842 are required. Prisms are cemented individually which is time-consuming and therefore costly.

Independently of said disadvantages the known process results in a structure in location 9 shown in FIG. 1, as can be seen from the detail in FIG. 2. The same reference marks as in FIG. 1 are used. Item number 11 identifies cemented joints.

From this it is evident that the cemented joints 11 cause an interruption of the red light reflection layer system 7 (consisting of 7' and 7") as well as the blue light reflection layer system 5 (consisting of 5', and 5").

As the X-cube is manufactured by cementing the individual prisms 2 whose 90° edges have been exposed to external influences without protection, faults occur almost inevitably in location 9 due to chipping defects along the 90° edges of the individual prisms.

SUMMARY OF THE INVENTION

The purpose of the present invention is to propose an optical element, in particular an X-cube, which is not afflicted by the disadvantages explained on the basis of FIG. 2.

It is also the objective of the present invention to propose a manufacturing process that is not afflicted by said disadvantages in production, in particular of said X-cubes. The manufacturing process to be found should by highly economical, afford greater accuracy, and require fewer process steps.

In an optical element of the type referred to at the beginning, this is achieved by depositing on the body a second layer system that adjoins the surface of the first layer system at an angle. In this way the first mentioned, optically effective layer system is areally continuous and the second layer system adjoins one of the surfaces of the first one without gap. A structure as has been explained based on FIG. 2 is avoided: According to the invention, with reference to FIG. 2, one of the layer systems, preferably 7, is continuous; individual sections 7', 7" no longer exist. According to the invention a second layer system, preferably system 5, 5' adjoins that continuous layer system 7, and in the case of an X-cube also a third layer system, 5". This is not illustrated in FIG. 2 which shows the familiar intersection structures.

Characteristic for the process according to the invention is that for solving the aforementioned task one surface each is created on at least two sub-bodies of the base body of the element, where said two surfaces are complementary to each other on at least two sub-bodies, that is, they fit together with close tolerances. Subsequently at least one of these complementary surfaces is coated with an optically effective layer system, in particular the red or blue reflection layer system, if the element to be produced is an X-cube.

Subsequently, said sub-bodies are joined, for example, by cementing along said complementary surfaces with their now embedded layer system. A composite sub-body is thus formed. On the composite sub-body one surface that is common to at least two sub-bodies is processed which is at an angle to the complementary, interconnected surfaces, so that the complementary surfaces along which the sub-bodies are connected intersect the common surface to be processed. Finally another optically effective layer system is deposited along this jointly processed surface.

The preferred design versions of the element or process according to the invention are specified in the dependent claims. The element according to the invention is preferably used as an X-cube, or the process according to the invention is preferably used for manufacturing such X-cubes.

An optical projection arrangement with at least one element designed as an X-cube according to this invention has significantly reduced optical interference, especially in the center area 9 shown in FIG. 2, and due to the proposed production process it can be manufactured more economically and more accurately.

BRIEF DESCRIPTION OF THE DRAWINGS

The invention is subsequently explained by means of the following illustrations.

DESCRIPTION OF THE PREFERRED EMBODIMENT

Figure 1:
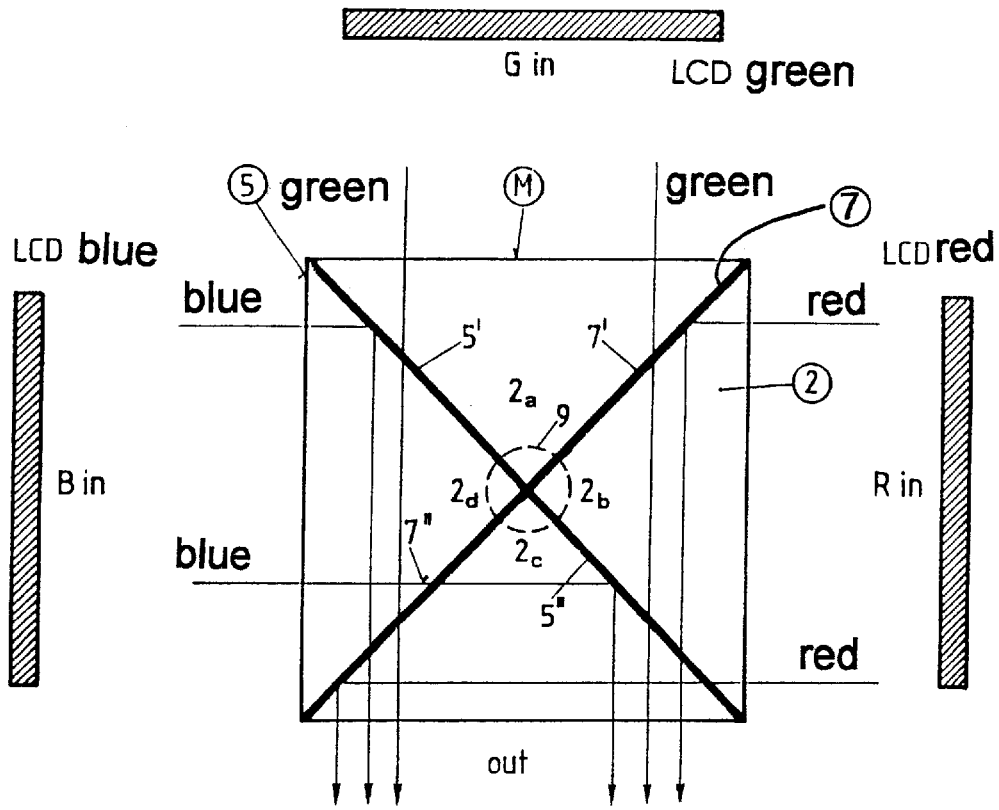
FIG. 1 is a top view of an X-cube of the conventional type for explaining the functional principle.
Figure 3:
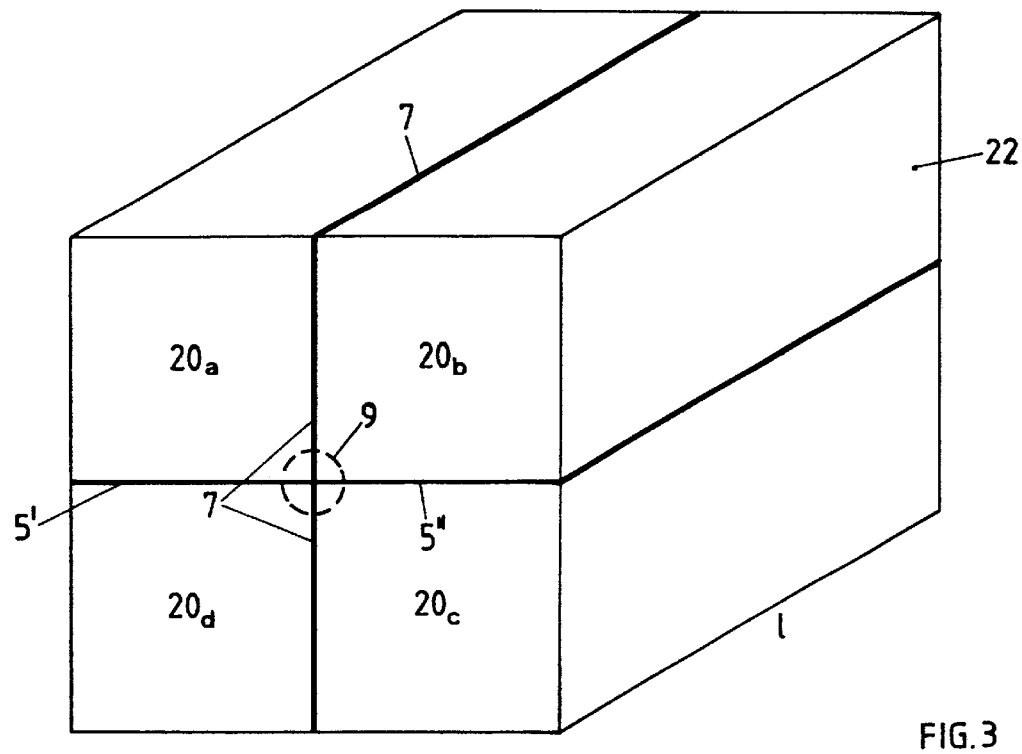
FIG. 3 in a perspective view of an intermediate product resulting from the process according to the invention, a product that is already an optical element according to the invention.

With respect to the production process of an X-cube according to the invention, FIG. 3 shows already an intermediate product according to the invention, it is the cuboid product from four sub cubes 20a to 20d. Between the sub cube pairs 20a and 20d on the one side and 20b and 20c on the other, there is a first optically effective layer system—for X-cube production and analogously to FIG. 1 layer system 7—whereas between the cube pairs 20a and 20b or 20d, 20c there is another optically effective layer system, that is, in the X-cube production and with respect to FIG. 1 layer system 5 with the parts 5' and 5". For the production of the X-cube length 1 of cube 22 is 1 to 8 x-cube lengths or greater, in particular 4 X-cube lengths, in FIG. 1 measured perpendicularly to the plane of the illustration. Basically this product whose manufacturing steps will subsequently be explained, is characterized as follows:

All existing angles are 90° (± tolerances), which means that the sub-bodies 20 and the intermediate product 22 are easy to manufacture, because, among others the opposite sides can be machined at the same time such as by dual lapping or dual polishing.

In simultaneous double-sided machining high parallelisms of the mutually opposite surfaces can be achieved, for example, with deviations of $\leq 2$ µm across a length of 150 mm. In addition a high planarity of each surface is achieved, for example, with planarity deviations of $\leq 1$ µm across lengths of 150 mm.

Because all angles involved are 90° (± tolerances), each of the parts 20a to 20d and 22 can be easily mounted and positioned. In dual lapping or dual polishing operations no elaborate fixture is required and the corresponding part can simply be inserted into a polishing insert. Mounting of the parts by plastering, blocking or wringing can preferably be eliminated.

All angles involved can be manufactured with high precision because they all have 90° angles and no angles of 45° for example, that are much more difficult to produce. The angle tolerances for the 90° central angle of the sub-bodies 20 are preferably no greater than ±20 angular seconds.

The measurement instrumentation for geometrically measuring the produced parts can be kept very small by using an interferometer, for example.

Particularly when plan parallel complementary surfaces to be cemented are used, cementing is very easy and cementing joints of accurately defined thickness can be produced.

The production of such parts is easy to scale, that is, by using plates of various sizes several workpieces 22 referred to as T-cubes can be produced in a single piece that is subsequently singularized.

Optical measuring on coated surfaces of bodies with plan parallel surfaces is much simpler than for triangular prisms.

Figure 2:
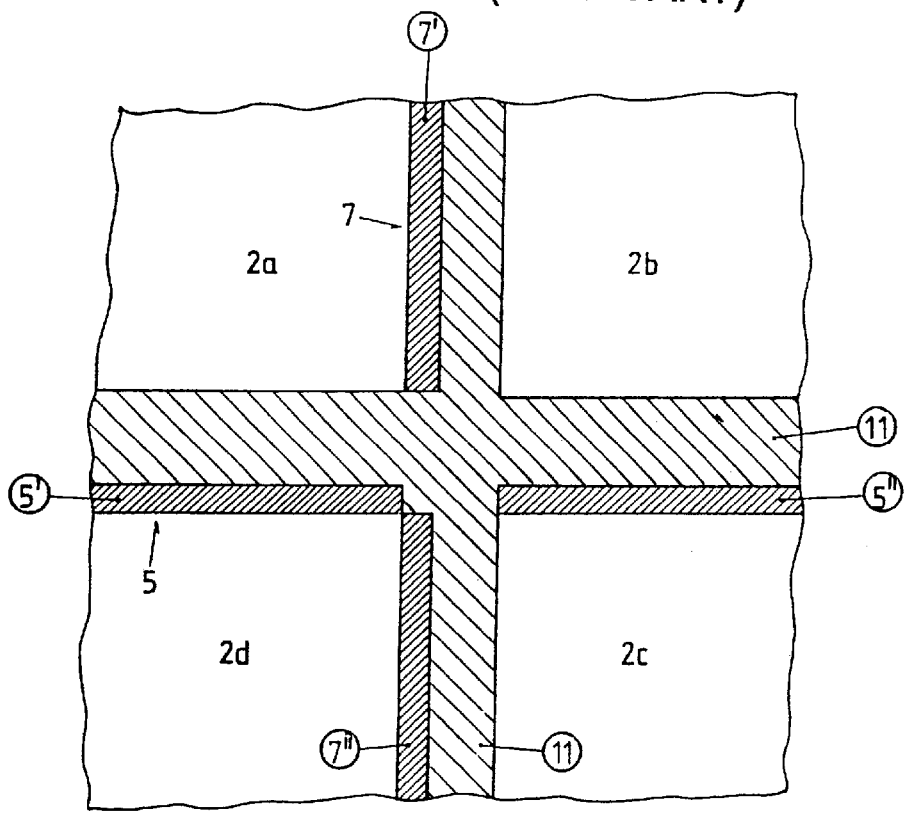
FIG. 2 is a central intersection area of the optically effective layer system on a conventional X-cube according to FIG. 1.
Figure 4A:
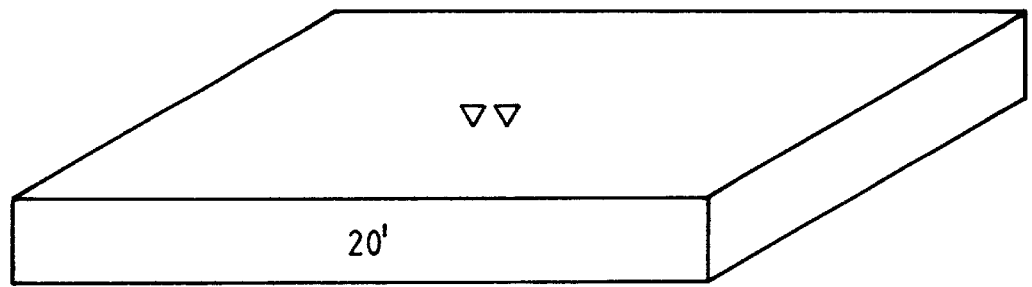
FIGS. 4a to 4h are intermediate products resulting from the process according to the invention, where the structures according to FIGS. 4f, 4g and: 4h already represent an optical element according to the invention.
Figure 4B:
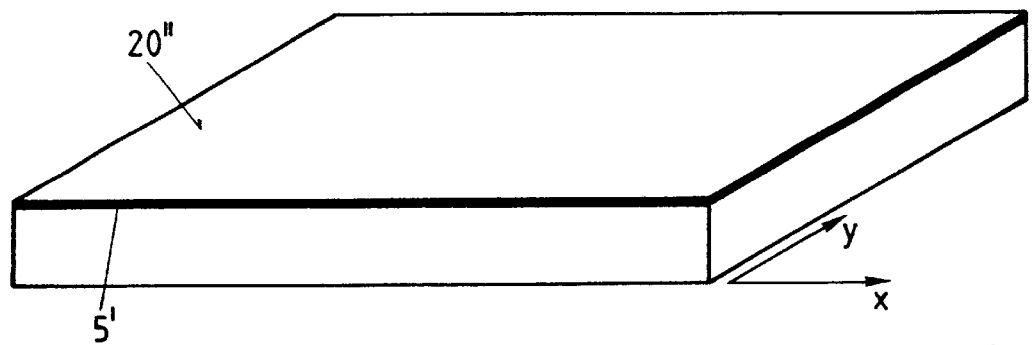
Figure 4C:
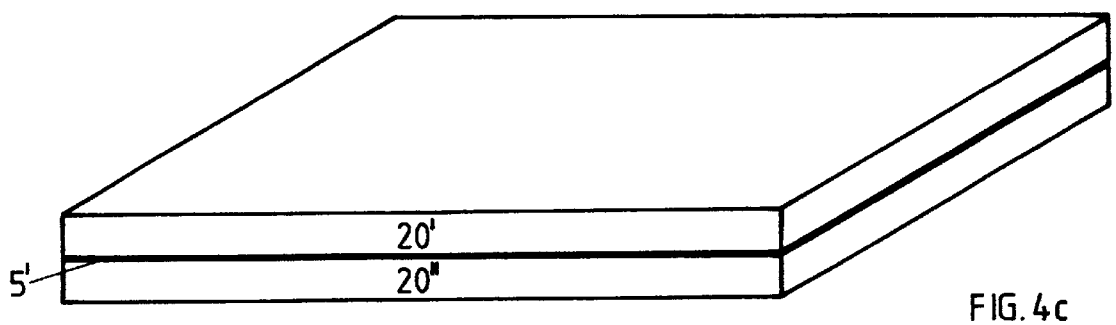

The following step-by-step description based on FIGS. 4a to 4c describes how body 22 shown in FIG. 3 which is already a product of the invention, is manufactured. It will become obvious that the disadvantages in the central area 9 as discussed on the basis of FIG. 2 are actually eliminated with respect to layer arrangement and edge precision.

FIG. 4a shows a plate for blanks 20'.

Through dual lapping, mutually opposite surfaces are machined according to FIG. 4b, particular the surfaces ∀∀.

Subsequently one of the surfaces ∀∀ of plate 20' is coated with a layer system 5' according to FIG. 4b, resulting in plate 20".

If the manufacturing process described here involves the production of X-cubes, preferably and as shown in FIG. 4b the blue reflection system 5' is deposited because the blue image may have more blur than the red image due to the corresponding sensitivity of the human eye.

It should be noted here that the plate 20' corresponds to the dimension of one or several elements, preferably four, in direction y as well as direction x; a singularization in both dimensions will be performed later.

According to FIG. 4 plates 20' and 20" are laminated, preferably by cementing, in such a way that the aforementioned layer system, preferably the blue reflection system 5', is embedded between them.

Whether only the surface of one of the plates 20" involved is coated or both, and correspondingly the cement film is located between the surface of one plate 20' and the layer, or between two layers, depends on the intended application. Preferred in the production of X-cubes is the coating of one of the complementary surfaces involved, and cementing of this surface with the complementary surface of the uncoated plate 20".

The term complementary surfaces is used because, as will be shown later for other applications, the bodies with surfaces of any curvature can be placed on top of each other with the embedded layer system, provided the surfaces involved are complementary with the required accuracy.

Figure 4D:
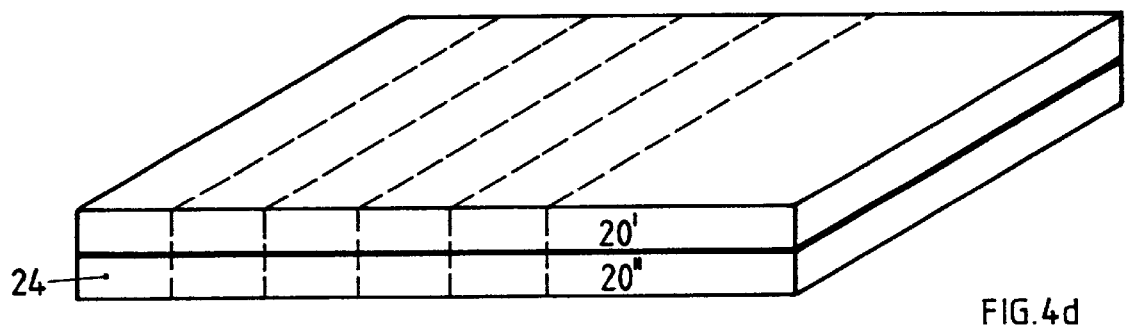

As shown in FIG. 4d the dual plates 20' and 20" are singularized by sawing them into bars 24.

Figure 4E:
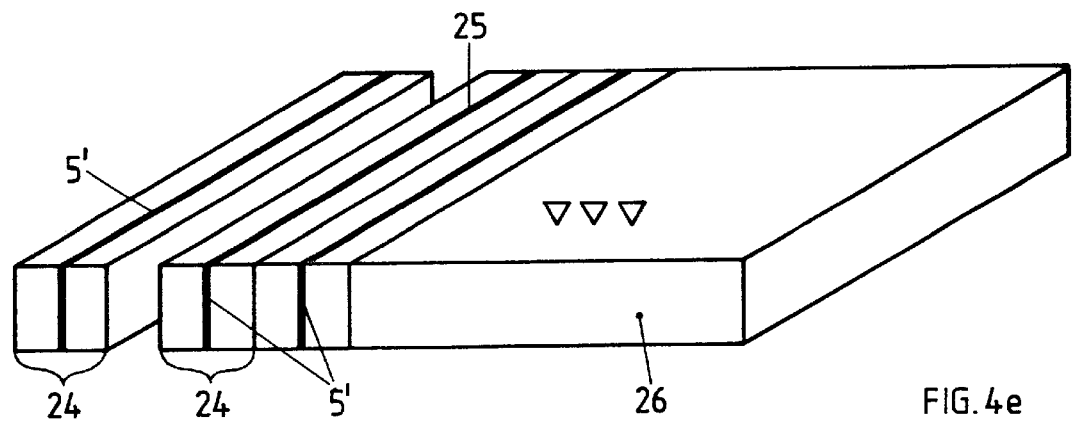

As shown in FIG. 4e the sawed bars 24 are tilted by 90° and preferably two or more such bars are placed adjacent to each other, 26, or as shown in the diagram on the left, an individual bar 24 is further processed.

For forming the plate 26 the bars must be aligned in such a way that in the next processing step the second layer system which in the X-cube production is the red reflection system 7, is deposited exactly perpendicularly on the surface to be processed. This is greatly simplified by the fact that all surfaces of the bar or bars 24 are perpendicular and practically plan parallel to each other and because they are extremely flat. For example, as indicated at 25, preferably several bars 24 can be wrought together in order to compensate any angular error resulting from the sawing process. As mentioned and as shown on the left, also individual bars 24 can be lapped or polished if the sawing process is sufficiently accurate. Lapping and polishing are given as examples of joint mechanical machining.

As shown with ∀∀∀ the opposite lateral surface of plate 26 or of the individual bar 24 can now be dual lapped or dual polished.

Figure 4F:
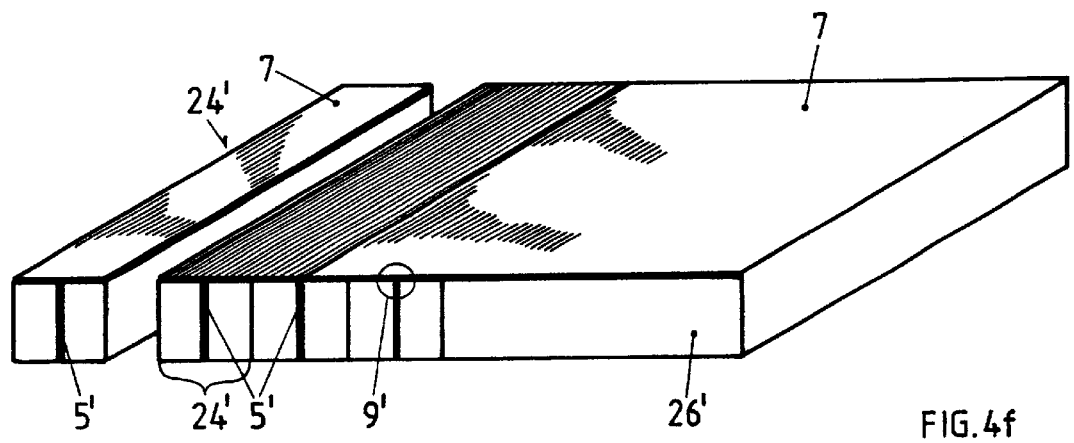

As shown in FIG. 4f and as a very important step of this invention, one of the polished surfaces of the plate 26 or the individual bar 24, in the first case for all bars 24 involved, are jointly repolished and subsequently coated. In the X-cube production a red reflection layer system 7 is deposited at this point, as shown in FIG. 4f. Polishing is given as an example of the jointly mechanically machining of the surfaces of all the bars which machining also extends over an edge of the joint cemented between the bars, as shown in FIG. 4f.

In this way the first layer system 5 and the cementing film are full-surface coated with 7 after repolishing. Preferably a relatively cold coating process is used, preferably a plasma and/or ion assisted coating process, preferably a sufficiently cold PVD process or PECVD process, but in particular a cold coating process with substrate temperatures not exceeding 150° C., preferably not exceeding 80° C.

The structure of the process according to FIG. 4f and the procedure proposed so far are inherently inventive, regardless of whether or not the layer systems represented with 5 and 7 are deposited perpendicularly or obliquely to each other, and whether or not the coated surfaces are plane or as mentioned above, complementary curved. Intersections 9' are created on which one layer system—7—continuously overlaps the intersection of the second layer system—5—.

Figure 4G:
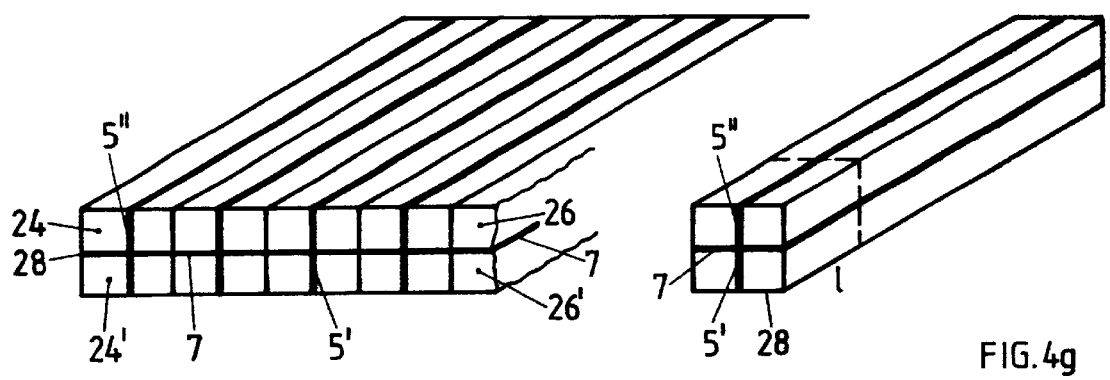
Figure 4H:
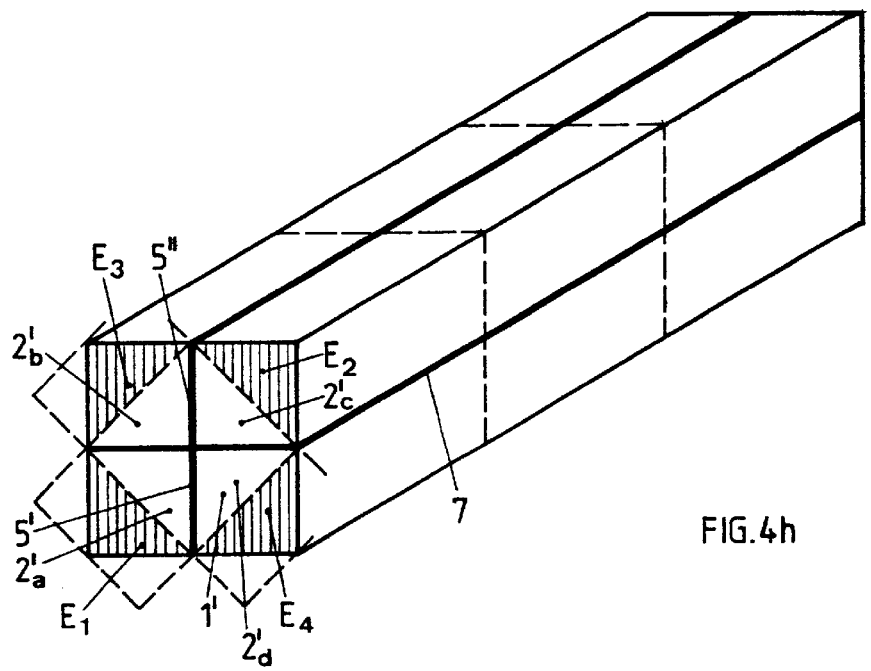

According to FIG. 4g an uncoated plate 26 or an uncoated individual bar 24, after unwringing if applicable, and a coated plate 26' or a coated individual bar 24' are placed on top of each other and cemented as shown in FIG. 4f. The layer system 5' of the uncoated plate 26 or the uncoated bar 24, as the third deposited layer system in addition to the two systems 7 and 5' on the coated plate 26' or the coated bar 24', now becomes layer system 5".

The resulting T-cube strips 28 are singularized into the desired lengths 1. But before singularization for the production of the X-cube the T-cubes are preferably chamfered by sawing and by machining their surfaces along planes E, preferably again on two sides, as shown with E1, E2, and E3, E4 respectively. After cutting to size in direction 1, very accurate X-cubes 1' according to the invention are obtained. The 45° angle tolerances do not exceed ±2 angular minutes, preferably no more than ±1 angular minute. If applicable the chamfered surfaces are coated on planes E in FIG. 4h with an antireflection system before the X-cubes are singularized.

Figure 5:
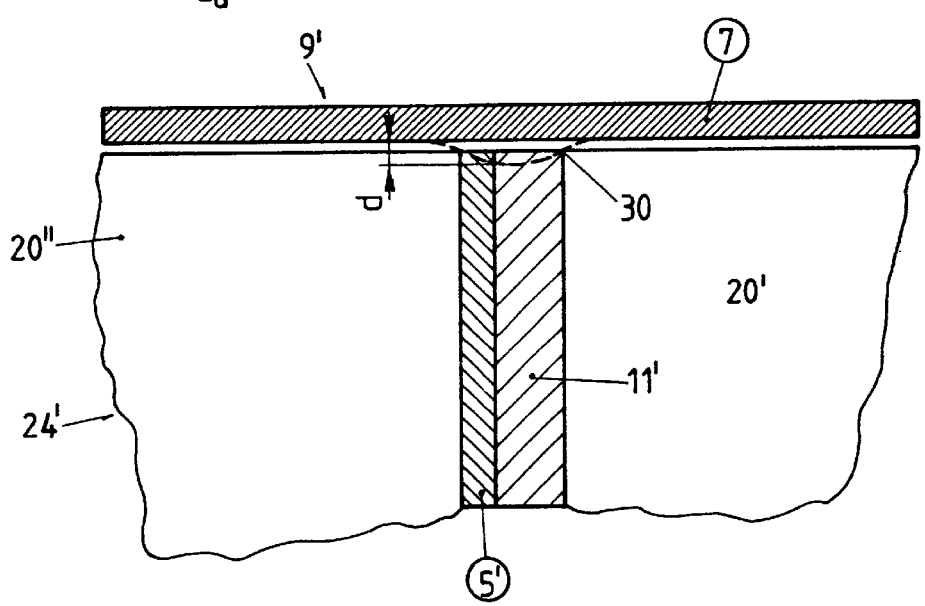
FIG. 5 is an enlarged view showing the intersection area of the layer system on the intermediate product according to the invention as shown in FIG. 4f.

Looking back at FIG. 4f, FIG. 5 is a detail 9' of an optical element 1 according to the invention, as it occurs in the production of X-cubes. In the latter a first optical layer system corresponding to 5' made of glass or plastic, preferably BK7 glass or polycarbonate or PMMA, which in X-cube production is the blue reflection system, is located between the plan parallel surfaces of the two separated bodies 20', 20" (FIG. 4e, 4d). The two bodies 20', 20" are cemented at 11'. After joint surface finishing by polishing or lapping, layer system 5' covered with cement film 11', the second optical layer system corresponding to 7, in the case of the X-cube a red reflection system, is deposited on both bodies 20' and 20". As can be seen from the comparison with FIG. 2, the bisectioning of 7 into 7' and 7" is eliminated through this invention.

Through this process the intersection area normally exhibits a slight indentation of the cement film 11' as shown at 30 in FIG. 5, which has a maximum depth d with respect to the plane surface of layer 7 of max. 5 µm, preferably max. 2 µm.

Figure 6:
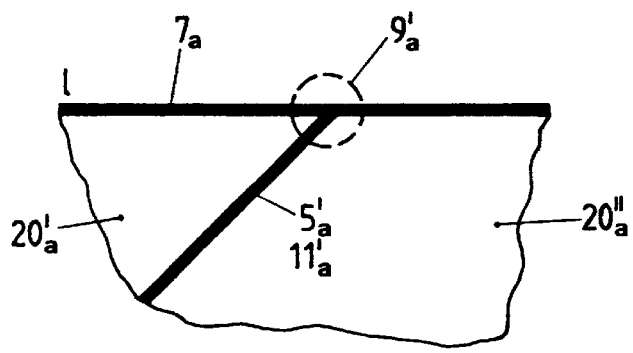
FIGS. 6 and 7 are generalized optical element structures according to the invention with their layer system intersection areas.

FIG. 6 shows in a generalized concept of FIG. 5 an optical element according to the invention in which the second layer system 5'a intersects obliquely with the plane layer system 7a.

Figure 7:
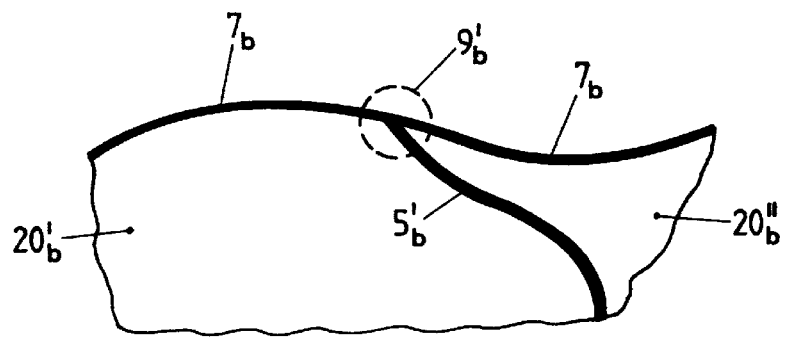

In FIG. 7 the complementary surfaces of the bodies 20'b', 20"b are curved, the same applies to the common surface coated with layer system 7b. In a highly defined manner the layers 5' and 7' intersect according to FIG. 5, for X-cube production in particular at a right angle. The one layer system—7—is continuous and in particular runs also across the point of intersection. This is particularly important in all applications where the intersection areas, for example corresponding to 9'b in FIG. 7 or 9'a or 9' in X-cube production, have an effect on the optical path of the light influenced by the layer systems, in particular the visible light. The professional now readily recognizes, particularly in conjunction with FIG. 4, how analogously optical elements can also be manufactured according to FIGS. 6 and 7, optical elements which according to present knowledge have probably never been realized. This results in completely new component structures that are suitable for optical beams in the visible range as well as the nonvisible spectral range such as UV or IR.

Figure 8:
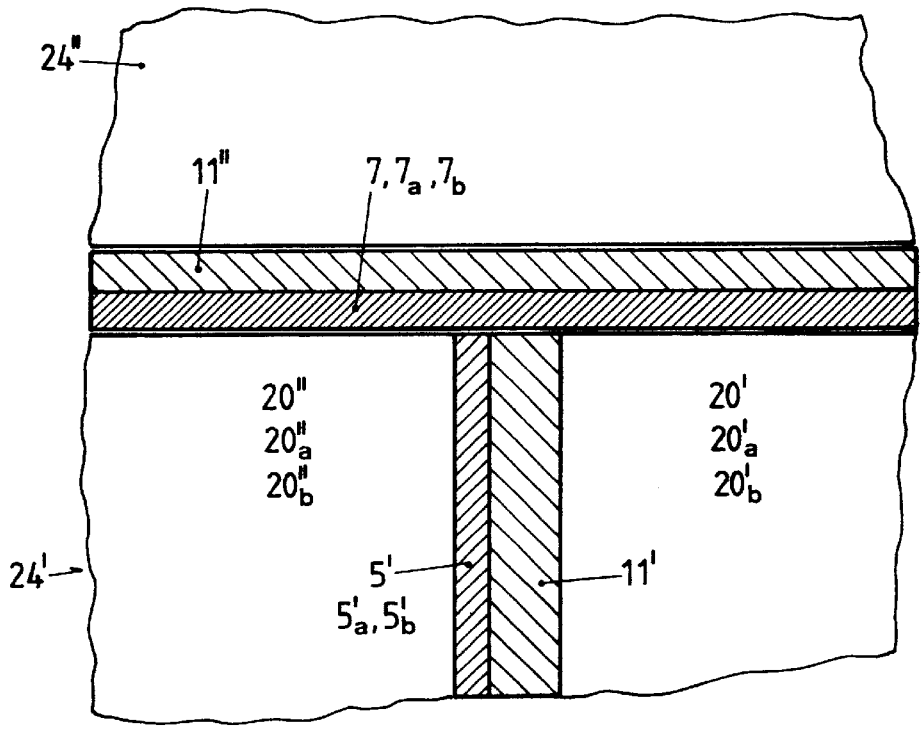
FIG. 8 is an enhanced development of the optical element illustrated in FIG. 5, or its intersection area according to the invention.

FIG. 8 shows the structure of another element according to the invention in which, based on the one in FIG. 5 and analogously to FIGS. 6 and 7, the continuous layer system 7 or 7a or 7b is covered by an additional body 24" and a cement film.

Figure 9:
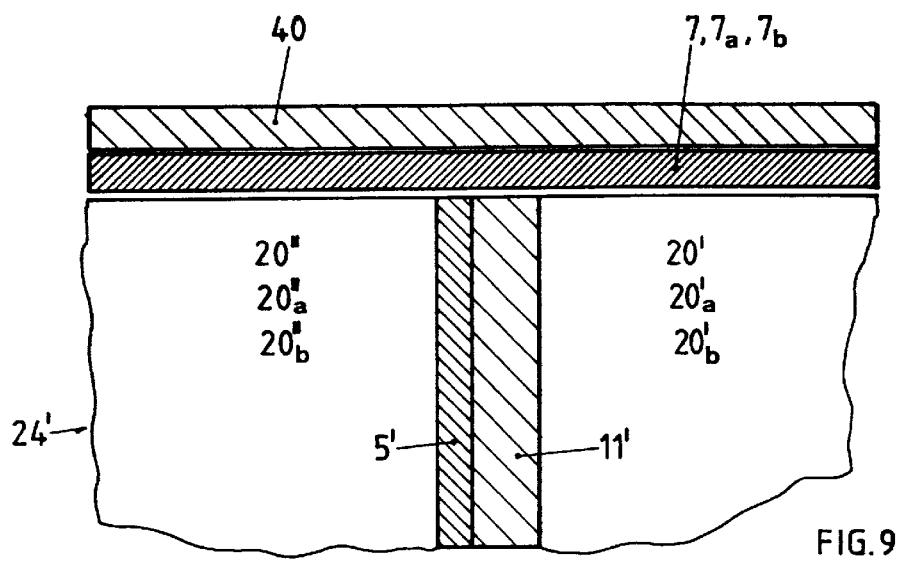
FIG. 9 is a view like FIG. 8 but based on the intersection area shown in FIG. 5, an enhanced development of an element according to the invention.

FIG. 9 shows the intersection area on the element according to the invention, for example, as shown in FIG. 5, in which the layer system 7 or with respect to FIG. 7, 7a or 7b is additionally coated, for example with a protection layer system 40.

Figure 10:
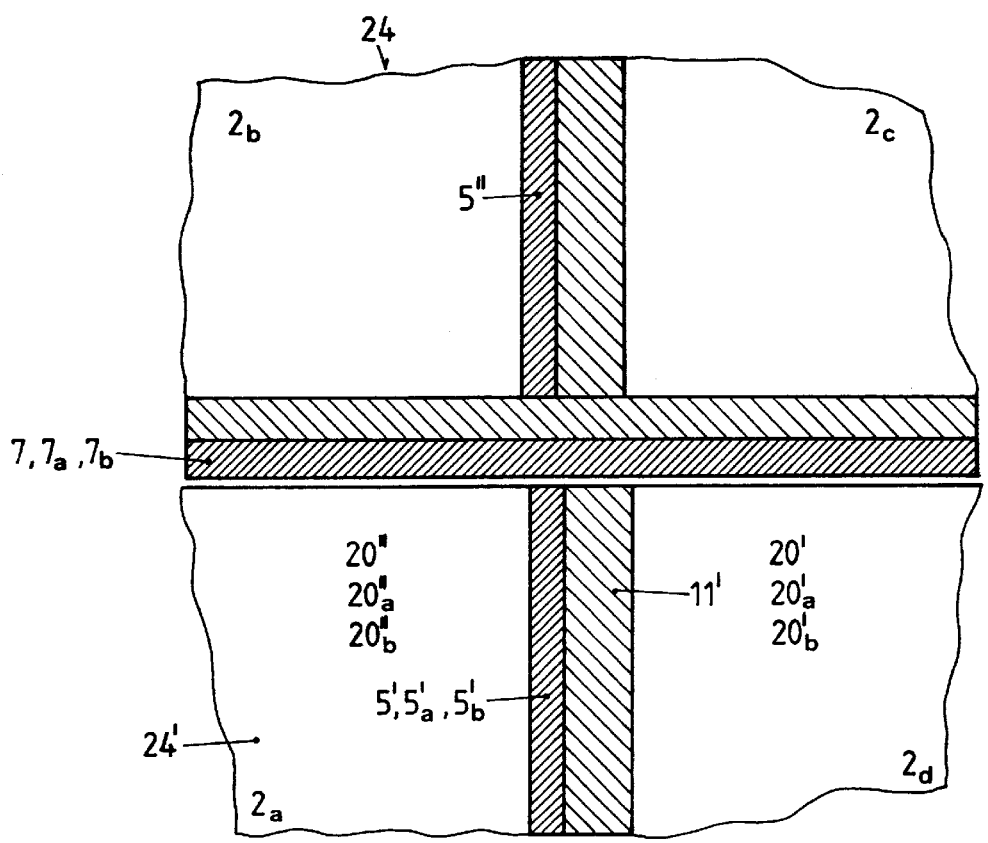
FIG. 10 shows a central intersection area on an optical element according to the invention, particularly as manufactured by the production process according to the invention, in comparison with the traditional intersection area shown in FIG. 2 on traditional optical components of the X-cube type.

Finally FIG. 10 shows the intersection area resulting in the production of a structure according to FIG. 3, that is, particularly an X-cube, where the continuous layer system 7 is preferably designed as a red reflection system. An analogous element indicated with the reference marks 'a' or 'b' is obtained based on FIG. 6 or 7.

Figure 11:
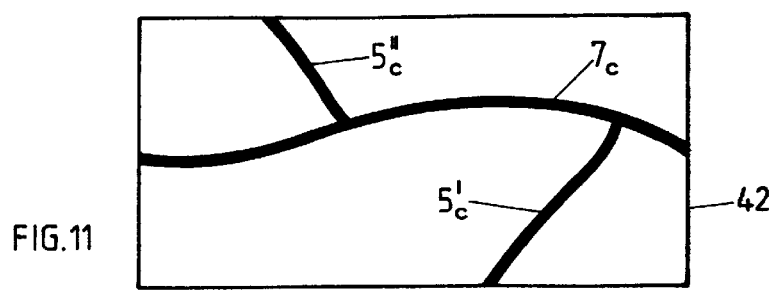
FIG. 11 is a schematic representation of a generalized optical element according to the invention as can be realized with the aid of the present invention.

FIG. 11 shows such a generalized optical element 42 according to the invention; the professional readily recognizes the multitude of possibilities that are opened by this invention.

In particular in the X-cube production with 90° blanks the more accurate machinability of mutually opposed surfaces, the cementing of the blanks, the joint coating and surface finishing and, preferably, the singularization into individual optical elements as the last step affords a considerable reduction of the manufacturing costs. It also results in elements with significantly fewer optically effective fault locations when we take into consideration that in the proposed process the delicate, centrally located 90° edges are never exposed.

Dielectric layer systems with at least one dielectric layer are preferably used as optically effective layer systems, particularly in the production of X-cubes. Suitable coating processes are the aforementioned, sufficiently cold processes. Of course, elements can be manufactured that are effective in spectral ranges other than visible light, for example in the UV or IR range, and in addition of color splitting layer systems, also reflection layer systems, anti-reflection layer systems, or polarization layer system can be used or integrated. In particular X-cubes used in projection systems can be manufactured for which high-precision, low-cost optical elements are required.

What is claimed is:

1. An optical device, comprising:
   a base body having a surface;
   a first optically effective, multilayer system disposed within said base body and terminating at an intersection area, at said surface of said base body;
   a second optically effective, multilayer system, said second system having one layer laying along said surface of said base body and spanning said intersection area;
   said surface of said base body, including said intersection area, being jointly treated by at least one of: milling, grinding, polishing, and lapping;
   a further base body having a further surface, a third optically effective, multilayer system disposed within said further base body and terminating at a further intersection area at said further surface of said further base body; and
   a further layer between said second optically effective multilayer system and said further surface.

2. The device of claim 1, wherein said first and said third multilayer systems abut respective opposite sides of said second multilayer system and said intersection areas are adjacent each other along said surfaces of said base bodies.

3. The device of claim 1, wherein said first and third multilayer systems abut said second multilayer system at substantially equal angles.

4. The device of claim 1, wherein said second multilayer system is planar and said first and third systems abut said second system at an angle of approximately 90°.

5. The device of claim 4, wherein said first, second and third layer systems are deposited along diagonal surfaces of a cuboid base body.

6. The device of claim 5, comprising an X-cube.

7. The device of claim 6, wherein said second system predominantly reflects selectively light in the visible red spectral range and predominantly transmits light in the visible blue and green spectral ranges.

8. The device of claim 7, wherein said first and third systems predominantly reflect light in the visible blue spectral range and, respectively, green spectral ranges and predominantly transmit light, respectively, in the visible green or blue spectral ranges.

9. The device of claim 1, wherein at least one of said systems is one of a solarization layer system and of a color splitting layer system and of an anti-reflection layer system.

10. The device of claim 1, wherein at least one of said systems is one of a red and of a blue reflector layer system, for S-polarized light at an incidence angle of 45°.

11. The device of claim 1, wherein said first system is embossed at its intersection area over-which said one layer of said second system extends.

12. The device of claim 11, wherein the jointly treated surface and intersection area are embossed at the intersection area by a depth of at most 5 µm.

13. The device of claim 12, wherein the jointly treated surface and intersection area are embossed at the intersection area by a depth of at most 2 µm.

14. The device of claim 1, wherein said further layer is a cement film.

15. An optical device, comprising:

a base body having a surface;

a first optically effective, multilayer system disposed within said base body and terminating at an intersection area, at said surface of said base body; and a second optically effective, multilayer system, said second system having one layer laying along said surface of said base body and spanning said intersection area;

said first system being embossed at its intersection area over-which said one layer of said second system extends;

said surface of said base body, including said intersection area, being jointly treated by at least one of: milling, grinding, polishing, and lapping;

the jointly treated surface and intersection area being embossed at the intersection area by a depth of at most 5 $\mu$m.

16. The device of claim 15, wherein the jointly treated surface and intersection area are embossed at the intersection area by a depth of at most 2 $\mu$m.

* * * * *